Feb. 4, 1969    R. C. VAUGHAN    3,426,223
MINIATURE DIRECT CURRENT MOTOR WITH PERMANENT MAGNET ROTOR
Filed Sept. 9, 1966

INVENTOR
Roy C. Vaughan
By Emery L. Groff Atty 3,426,223
MINIATURE DIRECT CURRENT MOTOR WITH
PERMANENT MAGNET ROTOR
Roy C. Vaughan, 7–9 Bowlers Croft, Honywood Road,
Basildon, Essex, England
Filed Sept. 9, 1966, Ser. No. 578,382
Claims priority, application Great Britain, Oct. 15, 1965,
43,782/65
U.S. Cl. 310—42          7 Claims
Int. Cl. H02k *15/00, 1/04, 37/00*

This invention relates to miniature direct current electric motors which are particularly suitable for use in small toys but may, of course, be used for other purposes. The principal object of the invention is to provide a lightweight motor of simplified construction and small power consumption which may be operated from a small dry battery.

The invention consists of a direct current motor comprising a rotor in the form of a drum shaped bi-polar permanent magnet mounted for rotation about its physical axis and having its magnetic axis perpendicular to its physical axis, a stator winding consisting of at least one coil encompassing the drum and having two opposite sides lying substantially in a plane containing the physical axis of the drum with its magnetic axis intersecting and perpendicular to the said physical axis, a pair of contacts connected in series with the winding, and means to open and close the contacts in sychronism with the rotation of the motor.

Preferably the rotor and the stator windings are supported on a base of non-magnetic material, which may be a synthetic plastic material, and the contacts are operated by a cam fixed to or formed upon a spindle upon which the rotor is carried.

Figure 1:
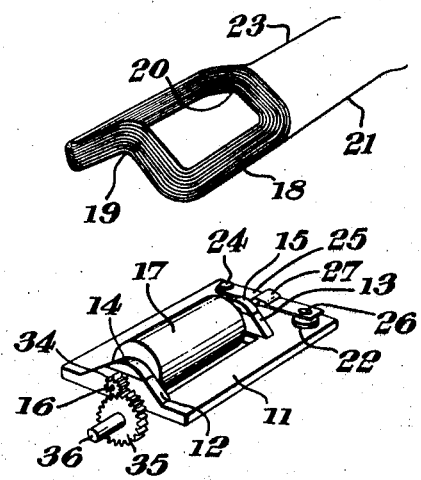
Figure 2:
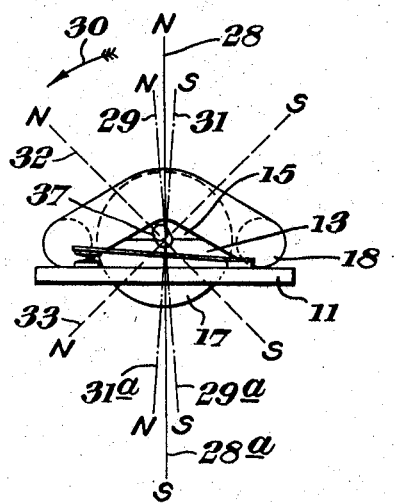

To promote a clear understanding of the invention one embodiment thereof will now be described with reference to the accompanying drawings, in which:

FIGURE 1 is a pictorial exploded view of the motor showing the stator winding separated from the base; and FIGURE 2 is an end view of the motor illustrating the interaction of the magnetic fields of the rotor and the stator winding.

Referring to the drawings, the motor comprises a base 11, which may conveniently be moulded or formed from a synthetic plastics material. At its two ends the base 11 has upwardly projecting lugs, respectively 12 and 13, each arranged to accept a bearing cap, respectively 14 and 15, to accommodate a rotor spindle 16 upon which is mounted a rotor 17, in the form of a drum magnet which is magnetized across a diameter, so that the magnetic axis is perpendicular to the physical axis of the drum magnet. A stator winding 18 is in the form of a generally rectangular coil with the two end portions formed to a V at 19 and 20 so that the winding will lie across the lugs 12 and 13 and bearing caps 14 and 15 and the opposite straight sides of the winding are parallel and lie substantialy in the plane containing the said physical axis of the drum magnet 17.

When the winding 18 is in position, as shown in FIGURE 2, one end 21 is connected to a fixed contact 22 mounted on the base 11. The other end 23 of the winding is left as a flying lead or is anchored to a terminal (not shown) to which a lead to a power source such as a small dry battery may be connected. Supported on a post 24 is a contact spring 25, to which the other lead from the power source is connected, and mounted on the end of the contact spring is a further contact 26. A small cam 27 is fixed to the end of the sprindle 16 and as the rotor rotates the contact 26 is brought into engagement with the contact 22 during a part of each revolution. The cam is conveniently formed by "upsetting" the end of the spindle or by setting the end of the sprindle over to form a crank 37, as shown in FIGURE 2.

The magnetic field set up by the stator winding 18 is at right angles to the physical axis of the spindle 16 and intersects it. Since the drum rotor 17 is magnetized across its diameter there is ineraction between the fields of the rotor and the winding, when energized, and the cam 27 is so phased in relation to the rotor rotation that the contact is made just past a point at which the north and south poles of the rotor field and the stator field are respectively coincident so that the respective north poles and the respective south poles repel each other until the rotor is rotated through almost one quarter of a revolution, after which the north and south poles of the rotor field are attracted respectively by the south and north poles of the stator field, so that the rotor is driven for almost 180°. The contacts open again just before the south and north poles of the rotor field are coincident respectively with the north and south poles of the stator field. The rotor then continues to rotate under its own momentum until the contacts are again closed. This mode of operation is illustrated in FIGURE 2 in which the stator field (when the contacts are closed) is indicated by the full line 28, 28a. Assume that at the instant at which the contacts close the rotor is in such position that its magnetic axis lies along the chain dotted line 29, 29a, and that it is running in the direction indicated by the arrow 30. The north pole of the stator field repels the north pole of the rotor and the south pole of the stator field repels the south pole of the rotor. A torque is consequently exerted on the rotor due to this repulsion, until the rotor has turned through about a quarter of a revolution. After this the south pole of the stator field at 28a begins to attract the north pole of the rotor at 29 and the north pole of the stator field at 31 begins to attract the south pole of the rotor at 29a. The contacts remain closed until these respective pairs of poles are almost coincident, as indicated by chain dotted line 31, 31a, at which point the contacts are opened, so that the stator field disappears. Due to the fact that no iron or other magnetic material is associated with the stator, there is no residual magnetism which would tend to hold the rotor at the coincident point, and the stator field disappears with extreme rapidity. Hence the rotor is allowed to continue to turn under its own momentum until its magnetic axis again reaches the position indicated by line 29, 29a. As described above and shown, the rotor experiences a torque for almost 180° of rotation in each revolution. It will be evident that if the cam and contact arrangement is altered so that the contacts are closed later in the rotation of the rotor and are opened earlier, then power will be supplied to the rotor during a smaller part of each revolution and both the speed and the maximum power output of the motor will be reduced, as illustrated by the dotted lines 32 and 33 in FIGURE 2, where the "power angle" has been reduced to about 90°, so that the motor will receive less power and will run at a lower speed.

FIGURE 1 illustrates a convenient method of taking off power from the motor, by fixing a driving pinion 34 to the sprindle 16, which meshes with a driving gear 35 mounted on a spindle 36 supported in a bearing moulded integrally with the base 11. This provides a useful speed reduction device since the speed of the motor according to the invention may be quite high.

In one practical embodiment a motor according to the invention was built into a miniature road truck of three inches overall length. The stator coil consisted of a coil of 130 turns of 31 S.W.G. enamelled copper wire and the rotor was in the form of a drum magnet of 0.38 inch overall diameter and 0.375 inch axial length with the rotor bearings about one-sixty-fourth of an inch in diameter. The total weight of the truck inclusive of the motor and a 1½ volt dry battery was 1½ ounces. The truck ran continuously for five hours at actual speeds of up to three miles per hour, the average full load current being 80 milliampheres.

A great convenience with the motor according to the invention is that it may be used without a separate switch since a slight spin (or a push of the model in which it is mounted) to cause the rotor to turn to a point at which the contacts are closed, is sufficient to start it, and it is only necessary to stop the model, i.e. stall the motor, in order to stop it. If the motor is forced to stop at a point at which current is actually flowing through the stator winding it will, on being released, only make a small fraction of a revolution, until the contacts open, and then stop again.

It will, of course, be evident that by mounting the contact spring on the other side of the cam or crank the motor may be arranged so that the contacts are normally closed and are opened for the appropriate periods by the cam during each revolution of the motor.

The motor may be adapted for operation from different voltages by including more than one coil in the stator winding. For example, if two coils are included then the two may be connected in parallel for use on a low voltage and in series for use on a high voltage.

It was stated that one end of the winding is connected to the fixed contact 22 which is mounted on the base 11. A convenient way of mounting this contact and fixing the wire to it is to form a stem on the contact and provide a hole or circular recess in the base 11 in which the stem on the contact is a close fit. The bared end of the wire lead from the winding is then placed in the hole or recess and the stem of the contact is forced into the hole or recess so that the contact is at once securely anchored and connected to the winding 18.

A similar procedure may be adopted in fixing the contact spring 25. The post 24 may be an ordinary eyelet to which the contact spring is soldered and a hole or circular recess may be provided in the base into which the stem of the eyelet will fit closely. A wire lead for connection to the power source has a bared end placed in the hole or recess and the contact spring with its eyelet is then pressed into position.

I claim:

1. A direct current motor comprising a rotor in the form of a drum shaped bi-polar permanent magnet mounted for rotation about its physical axis and having its magnetic axis perpendicular to its physical axis, a stator winding consisting of at least one coil encompassing the drum and having two opposite sides lying substantially in a plane containing the physical axis of the drum with its magnetic axis intersecting and perpendicular to the said physical axis, a pair of contacts connected in series with the winding, and means to open and close the contacts in synchronism with the rotation of the motor.

2. A motor as claimed in claim 1 in which the rotor is mounted on a sprindle, and the means to open and close the contacts is fixed on the end of the spindle, and comprises a cam.

3. A motor as claimed in claim 1 in which the contacts are normally open and are closed by the rotation of the rotor during a part of each revolution.

4. A motor as claimed in claim 1 in which the contacts are normally closed and are opened by the rotation of the rotor during a part of each revolution.

5. A motor as claimed in claim 1 in which the stator winding comprises a plurality of coils which may be connected in parallel or series to suit different driving voltages.

6. A motor as claimed in claim 1 comprising also a base having a recess therein, one of the contacts having a stem which fits closely into the recess, a connection to the contact being made by placing a bared wire in the recess and pressing the stem of the contact into position.

7. A motor as claimed in claim 1 comprising a base having a recess therein, one of the contacts having a stem which fits closely into the recess, a connection to the contact being made by placing a bared wire in the recess and pressing the stem of the contact into position and comprising also a second recess in the base, a contact spring co-operating with the said one contact being provided with a stem to fit into the second recess in the base, connection being made to the contact spring by placing a bare wire in the hole and pressing the stem on the contact spring into position in the hole.

References Cited

UNITED STATES PATENTS

| 2,301,425 | 11/1942 | List | 310—46 |
| 3,156,838 | 11/1964 | Winther | 310—42 |

FOREIGN PATENTS 240,188   8/1962   Australia.

WARREN E. RAY, *Primary Examiner.*

U.S. Cl. X.R.

310—43, 46, 69, 71, 156, 254